(12) United States Patent
Mohammed et al.

(10) Patent No.: US 10,791,125 B2
(45) Date of Patent: Sep. 29, 2020

(54) END-TO-END CONTROLLER PROTECTION AND MESSAGE AUTHENTICATION

(71) Applicant: FORD GLOBAL TECHNOLOGIES, LLC, Dearborn, MI (US)

(72) Inventors: Majed Samhan Mohammed, LaSalle (CA); Xin Ye, Farmington Hills, MI (US); James Martin Lawlis, Grosse Pointe Farms, MI (US); Stephen Robert Traicoff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 15/860,882

(22) Filed: Jan. 3, 2018

(65) Prior Publication Data

US 2019/0207950 A1    Jul. 4, 2019

(51) Int. Cl.
| | | |
|---|---|---|
| *H04L 29/06* | (2006.01) | |
| *H04W 12/10* | (2009.01) | |
| *G06F 21/60* | (2013.01) | |
| *H04L 29/08* | (2006.01) | |
| *G06F 21/85* | (2013.01) | |

(52) U.S. Cl.
CPC .......... *H04L 63/123* (2013.01); *G06F 21/606* (2013.01); *G06F 21/85* (2013.01); *H04L 63/08* (2013.01); *H04L 63/12* (2013.01); *H04L 63/14* (2013.01); *H04L 67/12* (2013.01); *H04W 12/10* (2013.01)

(58) Field of Classification Search
CPC ..... H04L 63/08; H04L 63/0869; H04L 63/12; H04L 63/123; H04L 63/126; H04L 63/14; H04L 9/32; H04L 9/3236; H04L 9/3239; H04L 9/3242
See application file for complete search history.

(56) References Cited

U.S. PATENT DOCUMENTS

| | | |
|---|---|---|
| 2016/0330032 A1 | 11/2016 | Naim et al. |
| 2016/0381068 A1 | 12/2016 | Galula et al. |
| 2017/0134394 A1 * | 5/2017 | Xu ....................... H04L 63/0435 |

FOREIGN PATENT DOCUMENTS

WO    WO-2013128317 A1 *   9/2013    ........... H04L 9/3242

* cited by examiner

*Primary Examiner* — Edward Zee
(74) *Attorney, Agent, or Firm* — Michael J. Spenner; Brooks Kushman P.C.

(57) ABSTRACT

A first electronic control unit (ECU) is in communication with a second ECU over a vehicle bus. The first ECU is configured to generate functional safety values and security protection values for a message, validate the security protection values for the message, and send the message to the second ECU including the security protection values but not the functional safety values.

17 Claims, 7 Drawing Sheets

END-TO-END CONTROLLER PROTECTION AND MESSAGE AUTHENTICATION

TECHNICAL FIELD

Aspects of the disclosure generally relate to systems and method for protection of communications between electronic control units (ECUs).

BACKGROUND

Functional safety generally relates to an absence of unreasonable risk due to hazards caused by malfunctioning behavior of electrical or electronic systems. Security measures generally relate to defenses incorporated at the edge or internal to a network to block intruders or other malicious actors from carrying out exploits or threats on a network. Both functional safety and security measures are useful to secure a system. However, functional safety and security measures both add overhead and complexity to systems.

SUMMARY

In one or more illustrative examples, a system includes a first electronic control unit (ECU) in communication with a second ECU over a communication bus. The first ECU is configured to generate security protection values for a message (e.g., counter, checksum, freshness, and message authentication code (MAC) values), validate the end-to-end (E2E) communication protection values for the message (e.g., counter and checksum), and send the message to the second ECU including the security communication protection values (e.g., freshness and MAC) but not the E2E communication protection values (e.g., counter and checksum).

In one or more illustrative examples, a method includes generating, by a first electronic control unit (ECU), counter and checksum values for a message; validating, by the first ECU, the counter and checksum values; sending, to a second ECU, the message including freshness and network interface identifier values but not the counter and checksum values; regenerating the counter and checksum values by the second ECU; and validating the regenerated counter and regenerated checksum values by the second ECU.

In one or more illustrative examples, a non-transitory computer-readable medium comprising instructions that, when executed by a processor of a first electronic control unit (ECU) in communication with a second ECU over a vehicle bus, cause the first ECU to generate counter, checksum, freshness, and message authentication code (MAC) values for a message, validate the counter and checksum values for the message, and send the message to the second ECU including the freshness and MAC values but not the counter and checksum values.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may include a first application that executes on a first ECU, and that uses a first communications stack of the first ECU to access a physical transmission medium. The system may further include a second application that executes on a second ECU, where the second application uses a second communications stack of the second ECU to access the physical transmission medium. Functional safety measures and security measures serve different purposes and protect against different types of issues in such a system. Both safety measures and security measures require network bandwidth or other resources to implement. This disclosure proposes two models to handle both security and functional safety for data communication between vehicle ECUs, while providing an optimal balance of security, functional safety, and resource overhead.

It should be noted that many examples discussed herein relate to the transportation domain and to vehicles specifically. However, it should be noted that the described techniques may be applicable to other systems that include at least two ECUs and a communication medium between the ECUs, and where the ECUs support both Functional Safety End-to-End (E2E) Communication protection and Security Communication protection. For instance, the described techniques may also be applicable in the medical, agricultural, and/or industrial domains.

Figure 1:
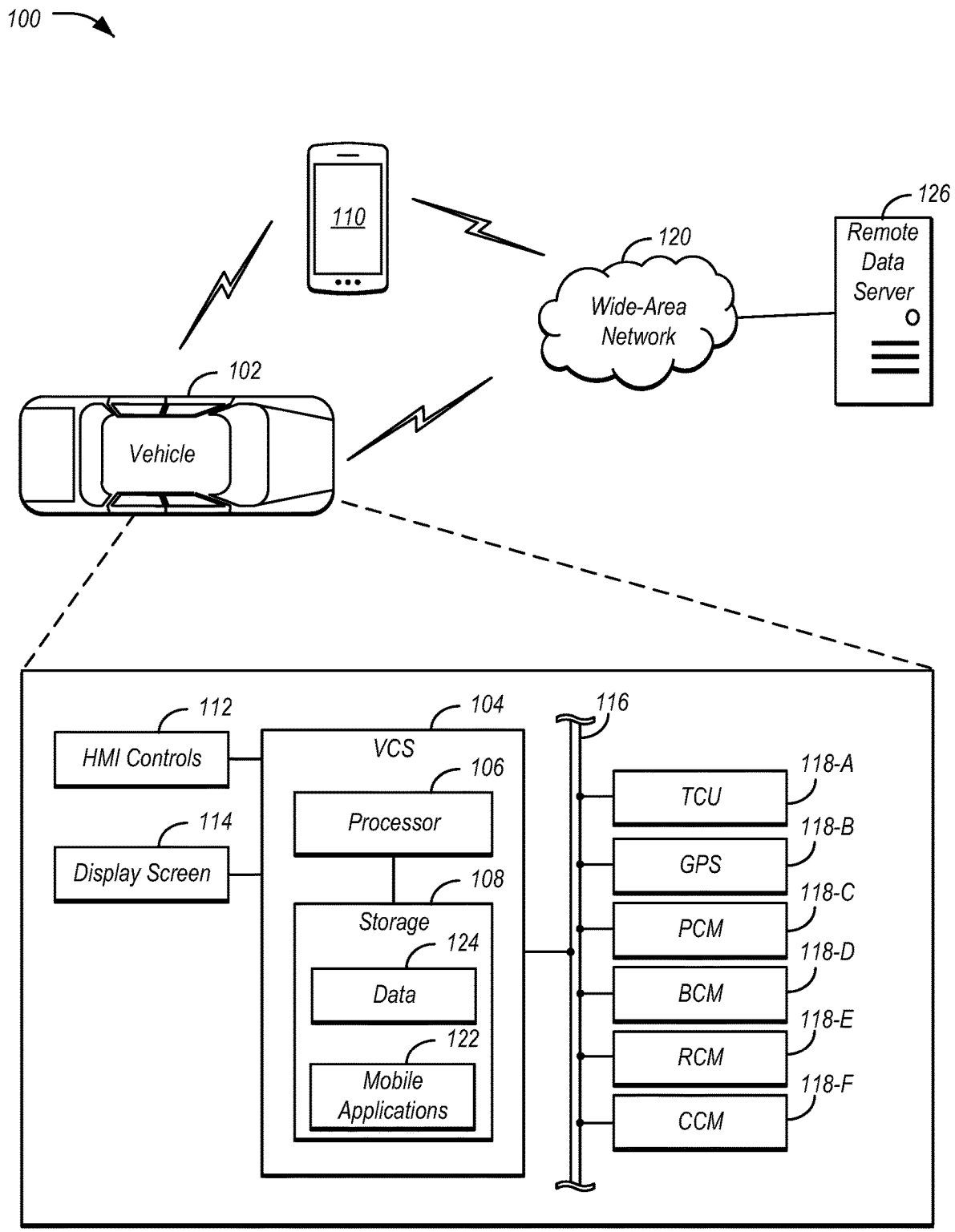
FIG. 1 illustrates an example system including a vehicle implementing functional safety measures and security measures.

FIG. 1 illustrates an example system 100 including a vehicle 102 implementing functional safety measures and security measures. The vehicle 102 may include a vehicle computing system (VCS) 104 configured to communicate over a wide-area network 120, e.g., using a mobile device 110 or a telematics control unit (TCU) 118-A. The system also includes a remote data server 126 configured to communicate with the vehicle 102 via the wide-area network 120. While an example system 100 is shown in FIG. 1, the example components as illustrated are not intended to be limiting. Indeed, the system 100 may have more or fewer components, and additional or alternative components and/ or implementations may be used. It should be noted that the use of a vehicle 102 environment is illustrative, as the functional safety measures and security measures may be utilized in other types of systems such as flight control system in an airplane, or a medical device or industrial machine.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The VCS 104 may be configured to support voice command and BLUETOOTH interfaces with the driver and driver carry-on devices, receive user input via various buttons or other controls, and provide vehicle status information to a driver or other vehicle 102 occupants. An example VCS 104 may be the SYNC system provided by FORD MOTOR COMPANY of Dearborn, Mich.

The VCS 104 may further include various types of computing apparatus in support of performance of the functions of the VCS 104 described herein. In an example, the VCS 104 may include one or more processors 106 configured to execute computer instructions, and a storage 108 medium on which the computer-executable instructions and/or data may be maintained. A computer-readable storage medium (also referred to as a processor-readable medium or storage 108) includes any non-transitory (e.g., tangible) medium that participates in providing data (e.g., instructions) that may be read by a computer (e.g., by the processor (s)). In general, the processor 106 receives instructions and/or data, e.g., from the storage 108, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc.

The VCS 104 may be configured to communicate with mobile devices 110 of the vehicle occupants. The mobile devices 110 may be any of various types of portable computing device, such as cellular phones, tablet computers, smart watches, laptop computers, portable music players, or other devices capable of communication with the VCS 104. As with the VCS 104, the mobile device 110 may include one or more processors configured to execute computer instructions, and a storage medium on which the computer-executable instructions and/or data may be maintained. In many examples, the VCS 104 may include a wireless transceiver (e.g., a BLUETOOTH controller, a ZIGBEE transceiver, a Wi-Fi transceiver, etc.) configured to communicate with a compatible wireless transceiver of the mobile device 110. Additionally, or alternately, the VCS 104 may communicate with the mobile device 110 over a wired connection, such as via a USB connection between the mobile device 110 and a USB subsystem of the VCS 104.

The VCS 104 may also receive input from human-machine interface (HMI) controls 112 configured to provide for occupant interaction with the vehicle 102. For instance, the VCS 104 may interface with one or more buttons or other HMI controls 112 configured to invoke functions on the VCS 104 (e.g., steering wheel audio buttons, a push-to-talk button, instrument panel controls, etc.). The VCS 104 may also drive or otherwise communicate with one or more displays 114 configured to provide visual output to vehicle occupants, e.g., by way of a video controller. In some cases, the display 114 may be a touch screen further configured to receive user touch input via the video controller, while in other cases the display 114 may be a display only, without touch input capabilities. In an example, the display 114 may be a head unit display included in a center console area of the vehicle 102 cabin. In another example, the display 114 may be a screen of a gauge cluster of the vehicle 102.

The VCS 104 may be further configured to communicate with other components of the vehicle 102 via one or more in-vehicle networks 116. The in-vehicle networks 116 may include one or more of a vehicle controller area network (CAN), an Ethernet network, or a media oriented system transfer (MOST), as some examples. The in-vehicle networks 116 may allow the VCS 104 to communicate with other vehicle 102 systems, such as a vehicle modem of the TCU 118-A (which may not be present in some configurations), a global positioning system (GPS) module 118-B configured to provide current vehicle 102 location and heading information, and various other vehicle ECUs configured to corporate with the VCS 104. As some non-limiting possibilities, the vehicle ECUs may include a powertrain control module (PCM) 118-C configured to provide control of engine operating components (e.g., idle control components, fuel delivery components, emissions control components, etc.) and monitoring of engine operating components (e.g., status of engine diagnostic codes); a body control module (BCM) 118-D configured to manage various power control functions such as exterior lighting, interior lighting, keyless entry, remote start, and point of access status verification (e.g., closure status of the hood, doors and/or trunk of the vehicle 102); a radio transceiver module (RCM) 118-E configured to communicate with key fobs or other local vehicle 102 devices; and a climate control management (CCM) 118-F module configured to provide control and monitoring of heating and cooling system components (e.g., compressor clutch and blower fan control, temperature sensor information, etc.).

The wide-area network 120 may include one or more interconnected communication networks such as the Internet, a cable television distribution network, a satellite link network, a local area network, a wide area network, and a telephone network, as some non-limiting examples. Using an embedded modem of the VCS 104 (or a mobile device 110 of the user connected to the VCS 104), the vehicle 102 may be able to send outgoing data from the vehicle 102 to network destinations on the wide-area network 120, and receive incoming data to the vehicle 102 from network destinations on the wide-area network 120.

The TCU 118-A may include a cellular modem or other network transceiver configured to facilitate communication over the wide-area network 120 between the vehicle 102 and other devices of the system 100. In an example, the VCS 104 may be configured to access the communications features of the TCU 118-A by communicating with the TCU 118-A over a vehicle bus 116. As some examples, the vehicle bus 116 may include a controller area network (CAN) bus, an Ethernet bus, or a MOST bus. In other examples, the VCS 104 may access the wide-area network 120 using the communications services of the mobile device 110. In an example, the VCS 104 may communicate with the mobile device 110 over a local area connect (e.g., BLUETOOTH), and the mobile device 110 in turn communicates over the wide-area network 120 using a cellular modem of the mobile device 110.

Mobile application 122 may be included on the storage 108 of the VCS 104. The mobile applications 122 may include instructions that, when executed by the processor of the VCS 104, cause the VCS 104 to perform operations such as display a map depicting the vehicle in the context of the surrounding roads. The mobile applications 122 may utilize data 124 for maps maintained to the storage 108 of the VCS 104, such as indications of locations of deserts, mountains, building outlines, and so on.

The remote data server 126 may be configured to communicate with the vehicle 102 over the wide-area network 120. In an example, the remote data server 126 may send commands to the vehicle 102, such as a door unlock request. In another example, remote data server 126 may receive information from the vehicle 102 such as vehicle heath reports or diagnostics.

Figure 2:
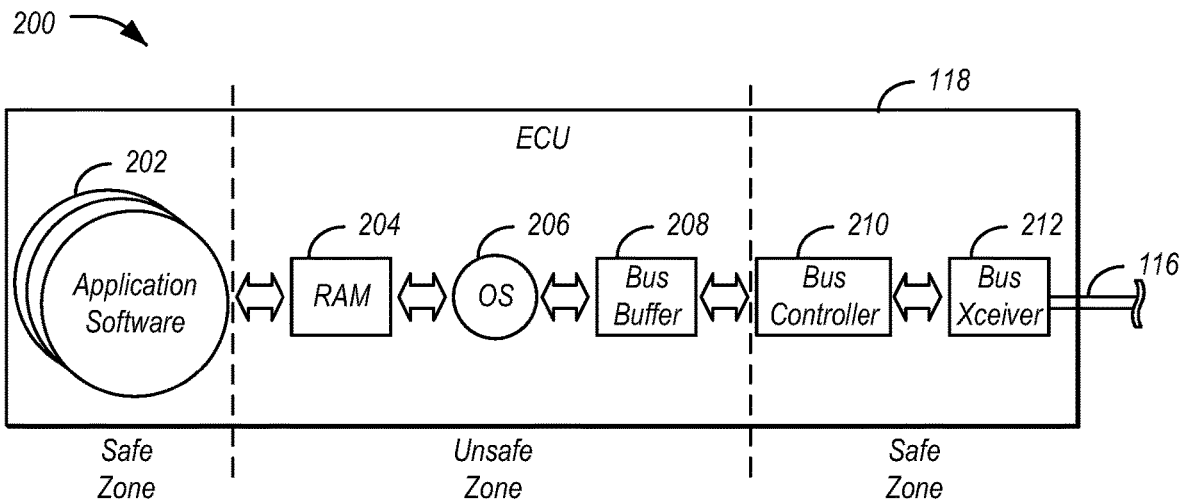
FIG. 2 illustrates an example diagram of an ECU configured for communication over the communications bus.

FIG. 2 illustrates an example diagram of an ECU 118 configured for communication over the vehicle bus 116. As shown, the ECU 118 includes application software 202 which may execute on a processor of the ECU 118. The application software 202 may access RAM 204 of the ECU 118, which also is utilized by an operating system (OS) 206 of the ECU 118. The OS 206 may further access a bus buffer 208 that stores data to be read by a bus controller 210. The bus controller 210 may communicate with a bus transceiver 212 which communicates data between the ECU 118 and the vehicle bus 116.

Messages may be generated in the application area by the application software 202. This area is developed with high integrity to meet functional safety standards, such as ISO 26262 and IEC 61508 for safety critical systems. This area is considered Safe Zone (e.g., a high integrity design). A Safe Zone or high Integrity zone may utilize functional safety standards that vary according to industry, such as automotive (ISO 26262), aerospace (RTCA/DO-178B), medical (IEC 60601), railway (EN 50128), machinery (IEC 6206), Nuclear power stations (IEC 60880), process industry (IEC 61511), and the general functional safety standard (IEC 61508) as some possibilities.

E2E Protection is aimed at protecting against random hardware or systemic software and/or hardware faults that can occur in the middleware area shown in the figure (e.g., the Unsafe Zone). The Unsafe Zone may not be developed to the high integrity level as the application area because of factors such as cost and efficiency.

As discussed in detail herein, the described systems should cover various types of fault that can be triggered in the Unsafe Zone that can result in various communication failure modes (listed in Table 1). As an example, systematic software faults may include interruption of sending of data, overrun of the receiver (e.g. buffer overflow), or underrun of the sender (e.g. buffer empty). As another example, random hardware faults may include situations due to electrical overload, degradation, aging or exposure to external influences such as environmental stress. As yet a further example, transient faults may include situations due to external influences such as electromagnetic energy (EMI), electrostatic discharge (ESD), humidity, corrosion, temperature or mechanical stress/vibration, as some possibilities. The described systems should address the faults as enumerated in Table 1, as well as similar failure modes that can be detected by industry standard E2E protection methods and control fields.

| Communication Failure | Explanation |
| --- | --- |
| Repetition of Information | Information is received more than once |
| Loss of Information | Information or parts of information are removed from a stream of transmitted information |
| Delay of Information | Information is received later than expected |
| Insertion of Information | Additional information is inserted into a stream of transmitted information |
| Masquerading | Non-authentic information is accepted as authentic information by a receiver |
| Incorrect Addressing | Information is accepted from an incorrect sender or by an incorrect receiver |
| Incorrect Sequence of Information | Modified the sequence of the information in a stream of transmitted information |
| Corruption of Information | Changes information |
| Asymmetric Information Sent from a Sender to Multiple Receivers | Receiver do receive different information from the same sender |
| Information from a Sender Received by only a Subset of the Receivers | Receivers do not receive the information |
| Blocking Access to a Communication Channel | Access to a communication channel is blocked |

Figure 3:
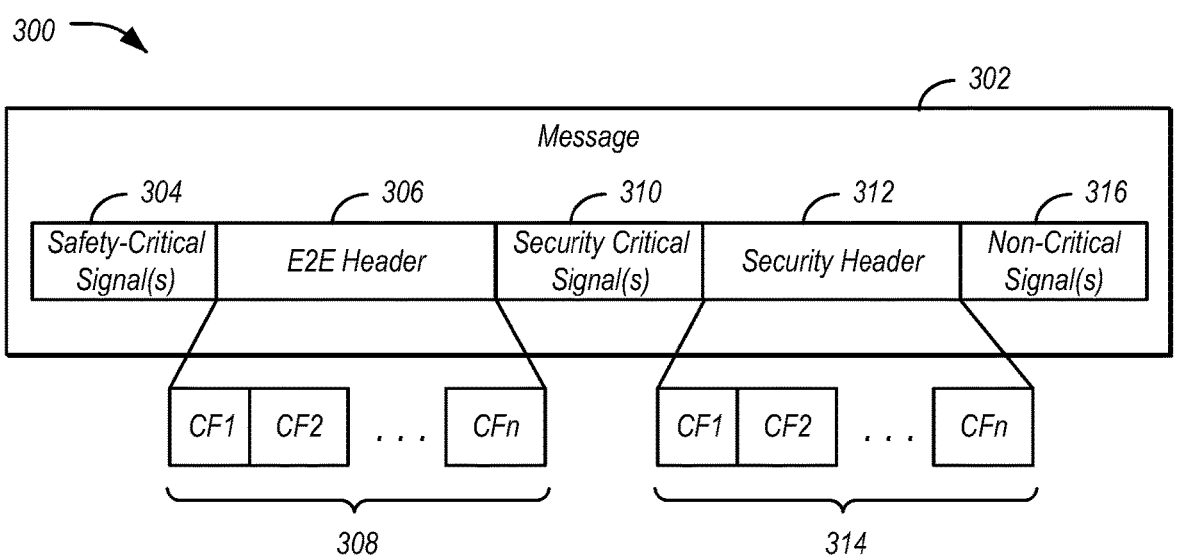
FIG. 3 illustrates an example diagram of information that is sent by an ECU.

FIG. 3 illustrates an example diagram 300 of a message 302 that is sent by an ECU 118. The message 302 may be provided by the bus transceiver 212 of the ECU 118 to the vehicle bus 116 to be received by other ECUs 118. As shown, the message 302 includes safety-critical signals 304, an E2E header 306 including E2E Control Fields 308, Security Critical signals 310, a Security header 312 including Security Control Fields 314, as well as various non-critical signals 316. Example E2E control fields 308 may include, as some possibilities, a data identifier, a counter, a check sum, and a cyclic redundancy check (CRC). Example Security control fields may include, as some possibilities, freshness, counter, and MAC.

A freshness value may be instantiated as a local timer value, a global real-time counter value, a security message counter, or as a security trip counter. The freshness value may additionally or alternately be created as a combination of these possibilities. A MAC may be dynamically-computed. For instance, the MAC may be computed from a combination of a security key, signals being transmitted, and also the freshness value. The MAC may therefore change over time, e.g., every transmission of any message 302 may result in a different MAC value. From a correct MAC, one may identify that the message 302 comes from the correct sender, has not been modified, and is fresh.

It should be noted that the data elements and ordering of data elements in the message 302 is merely an example, and more, fewer, different, or differently ordered fields may be used. It should also be noted that there may be partial or even full overlap between safety critical signals 310 and security critical signals 314, although a message 302 may still include two headers, one for E2E and one for security.

An E2E Protection and Security Protection method may follow the following pattern. On the sender side, a sender may determine which signals in the message 302 that needs E2E Protection and Security Protection, may generate E2E control fields 308 and security control fields 314 based on the protected signals, and may add E2E control fields 308 and security control fields 314 to the transmitted data. On the receiver side, a receiver may recalculate the E2E control fields 308 and security control fields 314 from the received data, may compare with the received content, and may take an appropriate response in case of mismatch. Various methods may be used to generate the E2E protection and security protection, such as hand coding, Autosar configurable modules, or model based development, as some examples. Various communication protocols may be utilized as well, such as CAN, LIN, Ethernet, and other wired and wireless communications. Various ECUs 118 may participate in the communication of the message 302, such as the example ECUs 118 discussed above, vehicle controls, and mobile devices 110 connected to the vehicle 102.

E2E Protection differs from security commination protection in a few ways. Regarding source, E2E threats are non-malicious and are caused within the system by either systemic design fault, random HW fault or external interfaces (the Unsafe Zone shown in the diagram). In contrast, security deals with malicious attacks from external sources. Regarding nature, E2E threats can be predicted and modeled (e.g. the failure modes caused by an EMI failure can be modeled and it is behavior predicted). In contrast, security threats are not predictable since hackers can always improvise around protection mechanisms. Regarding coverage and complexity, normally only subset of a message 302 will require E2E protection and E2E protection measures are normally simple and cover short Hamming distances. In contrast, security covers more data and are complex due to different threat natures. Regarding integrity vs. efficiency, the E2E protection is generated using high integrity software and hardware components following strict design rules specified in the functional safety standards, while security protection generation uses very efficient SW and HW components due to the complexity of the MAC.

E2E Protection similar to security commination protection in a few ways. Regarding failure modes, both of them deal with similar failure modes such as message 302 insertion, corruption, loss, delay, as some examples. Regarding protection mechanisms, the control fields 308 used in E2E Protection such as Counter and CRC are similar (but usually simpler) to the Security control fields 314.

Figure 4:
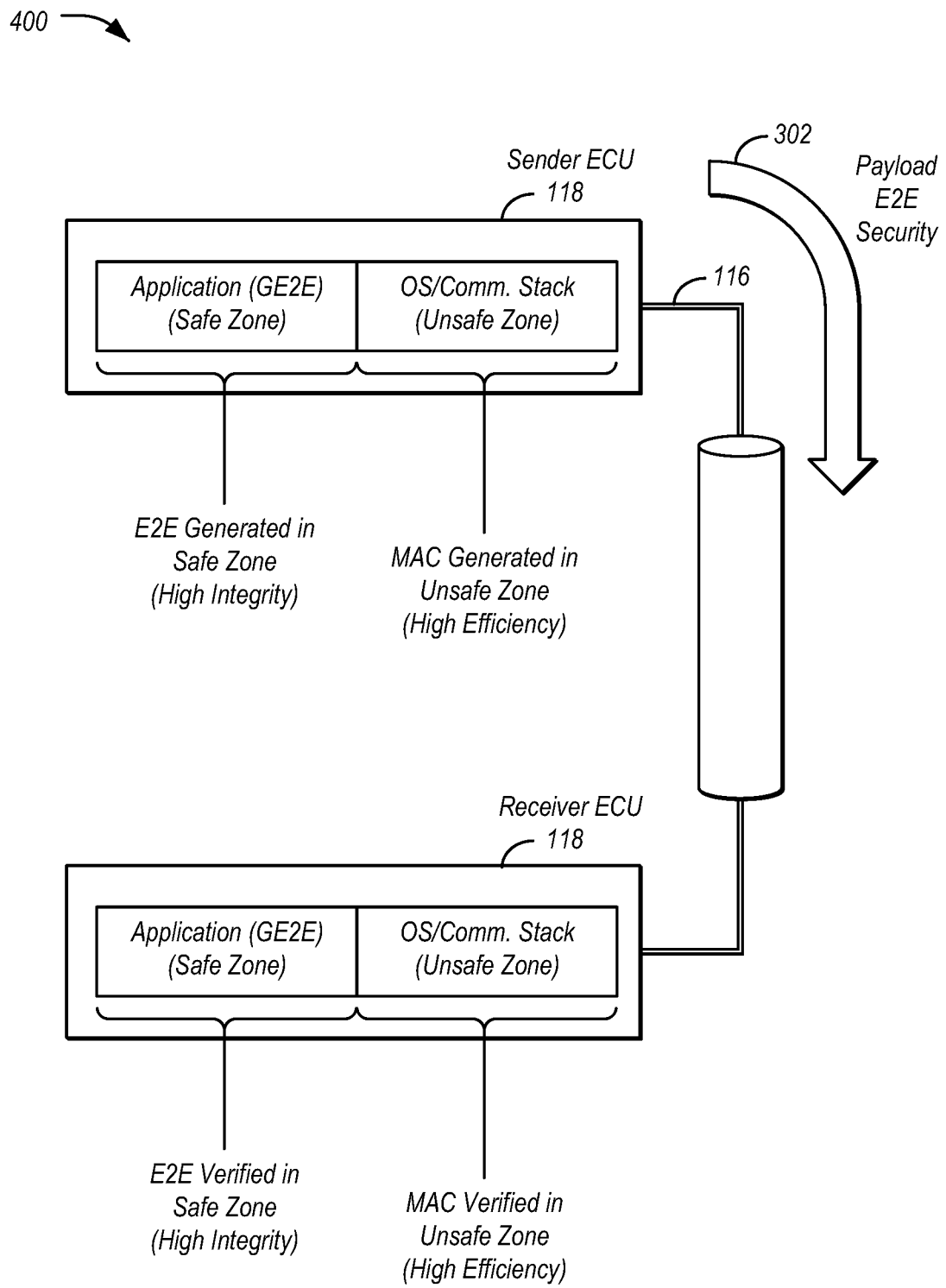
FIG. 4 illustrates an example diagram of communication between two ECUs of a broadcast network system.

FIG. 4 illustrates an example diagram 300 of communication between two ECUs 118 of a broadcast network system 100. As shown, the safety critical information 304 in a message 302 is generated by a sender ECU 118 in the high integrity application area (Safe Zone). E2E protection is also generated in the Safe/High Integrity Zone. The message 302 including the E2E Protection control fields 308 is "passed through" the Unsafe Zone. Security protection 314 (e.g., MAC, freshness, counter, etc.) is generated in the Unsafe/High Efficiency Zone. Both E2E Protection 308 and Security Protection 314 are added to the original message 302 (Payload) and sent by the communications Transceiver over the vehicle bus 116. The vehicle buses 116 may vary in internal protection. For instance, CAN messages 302 are sent with a built in CRC (e.g., added by the transceiver 212), but this protection is limited in coverage (e.g., it does not protect from message 302 insertion, delay, etc..) and does not protect from fault modes generated in the unsafe zone. The receiver ECU 118 receives the message 302 (with added E2E and Security protections). Security protection is verified in the receive Unsafe/High efficiency middleware Zone. E2E protection is verified in the receiver Safe/High Integrity Application Zone.

Figure 5:
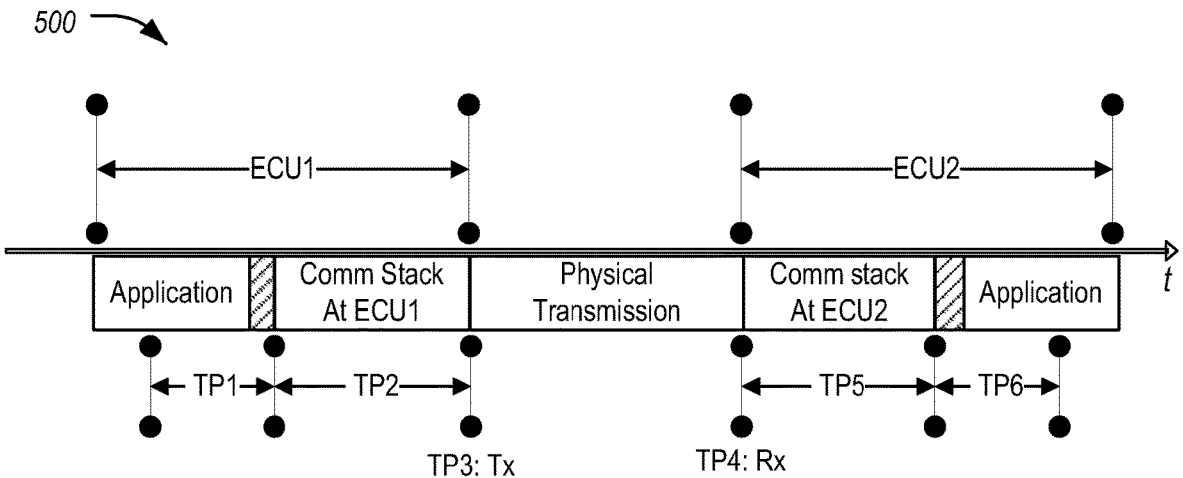
FIG. 5 illustrates an example diagram of details of the communication between two of the ECUs of the system.

FIG. 5 illustrates an example diagram 500 of details of the communication between two of the ECUs 118 of the system 100. In the diagram 500, a signal lifespan of a communication between a first ECU 118 (i.e., ECU1) and a second ECU 118 (i.e., ECU2) is shown. At time point 1 (TP1), a signal is created by application software 202 executed by the ECU1. At time point 2 (TP2), the signals are packed into messages 302 at ECU1 and loaded to the ECU1 communication stack. At time point 3 (TP3), the messages 302 created at TP2 are transmitted by the communication transceiver (included in the Communication Stack in the diagram) of ECU1 over a vehicle bus 116. In an example, the vehicle bus 116 may include a physical transmission medium such as CAN, CAN-FD, or Ethernet. At time point 4 (TP4), the messages 302 sent at TP3 are received by the ECU2 over the physical transmission medium. At time point 5 (TP5), the messages 302 received at TP4 are processed by the communication stacks of the ECU2 to unpack the signals from the received messages 302. At time point 6 (TP6), the ECU2 process the received signals by an application software 202 executed by the ECU2.

Figure 6:
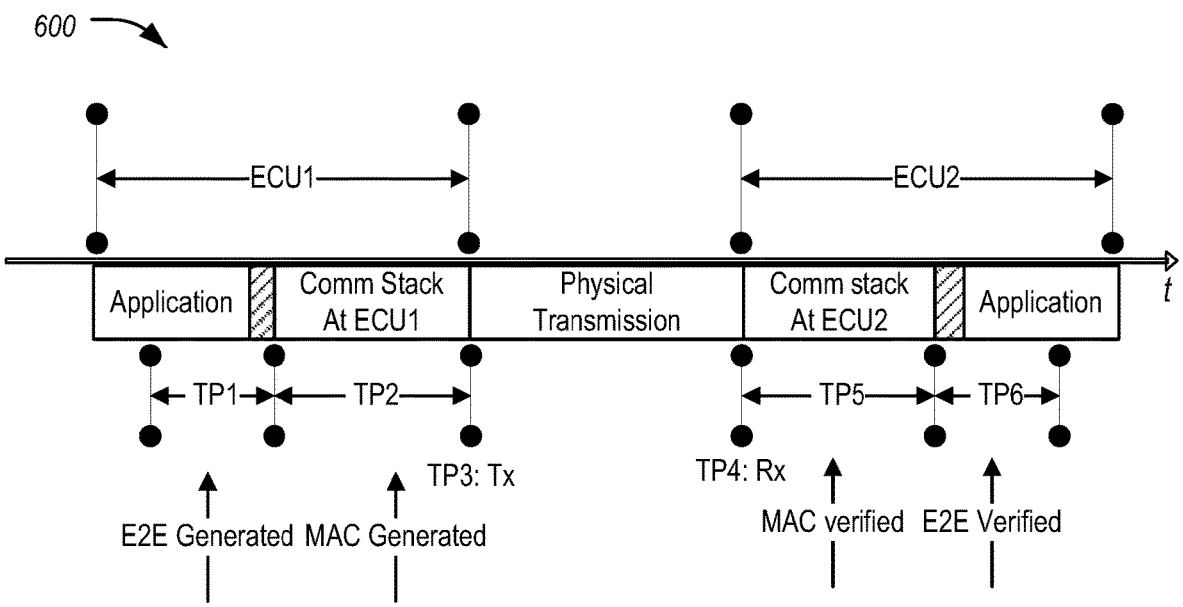
FIG. 6 illustrates an example diagram of an independent model of functional safety measures and security measures.

FIG. 6 illustrates an example diagram 600 of an independent model of functional safety measures and security measures. The independent model includes a set of additional safety and security measures that may be performed in the context of the communication illustrated above with respect to the diagram 200.

In the independent model, E2E Protection 308 such as a checksum and a counter are created during TP1. The checksum and the counter are then packed into the messages 302 to be transmitted. In an example, the checksum may be created as a ones' complement of the ones' complement sum of the message 302. In another example, the counter may be an arbitrary increasing value, e.g., based on a variable for the message 302 stream between the ECU1 and the ECU2 maintained at the ECU1. These values may be added to increase safety, e.g., to protect against electronic processing errors in the sending of the messages 302.

During TP2, Security Protection 314 such as a freshness value and a MAC value are created, e.g., by the communication stack of the ECU1. The freshness and MAC values are then packed into the messages 302 to be transmitted. In an example, the freshness value may be a timestamp, e.g., a value derived from current time information. The freshness value may, accordingly, be useable to identify whether a message 302 is recently sent or has been aged. The MAC value may be a MAC address of the communication stack of the ECU1. These values may be added to increase security, e.g., to protect against electronic processing errors by the ECU1 or during channel transmission, as well as to mitigate short-term replay threats and signal spoofing from attackers.

The messages 302, including the additional checksum, counter, freshness, and MAC values may be transmitted at TP3 by the communication stack of ECU1 over a vehicle bus 116 and received at TP4 by the communication stack of the ECU2.

During TP5, the communication stack of the ECU2 verifies the freshness and MAC address of the received messages 302. In an example, the ECU2 may verify that the freshness indicates the message 302 was sent at a time that is less than a predefined threshold time ago. In another example, the ECU2 may verify that the MAC address is of the expected sender ECU1.

During TP6, the ECU2 verifies the checksum and counter aspects of the received messages 302. In an example, the ECU2 may confirm that the checksums match the data of the received messages 302. In another example, the ECU2 may confirm that for each received message 302 the counter corresponds to the next incremented value.

Thus, in using the independent model, message 302 authenticity, integrity, and freshness are ensured on the network. Additionally, end-to-end functional safety protection is achieved. As an advantage to the independent model, safety and security are processed independently, meaning that the validations for each do not interfere with one another. However, as compared to the approach shown in the diagram 500, the independent model may have relatively low efficiency on the network because all of the checksums, counters, freshness values, and MAC are transmitted over the network.

It is possible to reduce additional load on the communication bus by sending only the security protection without the E2E Protection. Some approaches to do so may include combining the E2E and Security in the ECU 118 itself by either generating the E2E in the Unsafe/High Efficiency zone or generating Security in the Safe/High Integrity zone. However, such approaches may be impractical.

Figure 7:
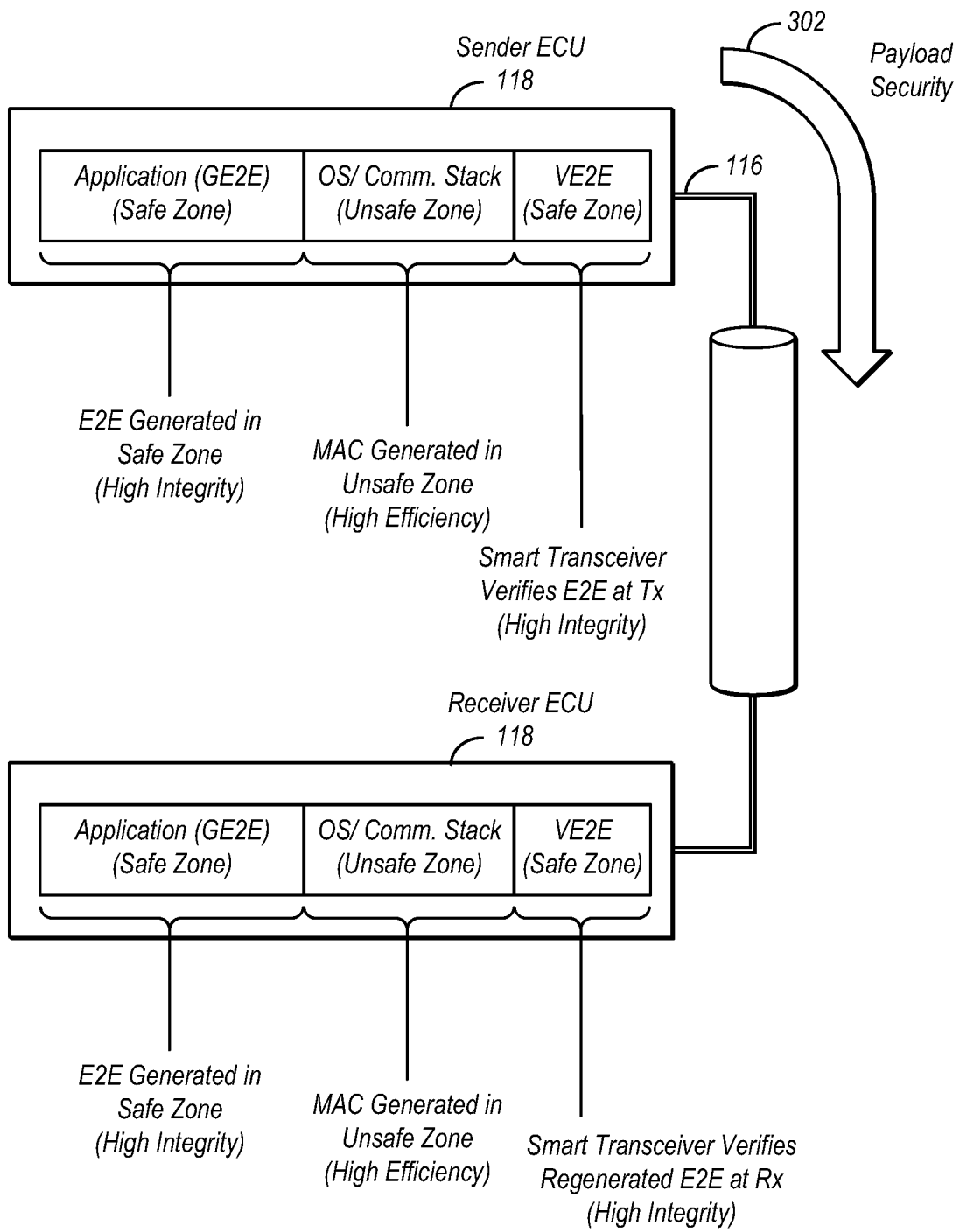
FIG. 7 illustrates an example diagram of communication between two ECUs of the system using a smart transceiver.

FIG. 7 illustrates an example diagram 700 of communication between two ECUs 118 of the system 100 using a combination of smart bus controller 210 and/or smart transceiver 212. As shown in the diagram 700, a mechanism is created in which an additional Safe Zone/High Integrity area is located during message 302 processing before the message 302 is sent via the vehicle bus 116. This mechanism has two roles. On the transmitter side, the mechanism may check that the message 302 is not corrupted while en route from the application area to the transceiver. If the message 302 is corrupted, then the mechanism may take pre-defined actions per the safety strategy of the system. If no issue detected, then the E2E protection 308 may be stripped from the message 302 and only the security protection will be transmitted in addition to the payload. On the receiver side, the mechanism may recreate the E2E Protection 308 from the received message 302 and send the message 302 including the recreated data to the application area for verification.

It is noted that there may potentially be corruption of a message 302 while in transit between the two ECUs 118. Notably, security protection 314 may detect corruption while the message 302 is in transit. Security protection, however, does not provide protection inside the ECU 118, which is the main areas of operation for E2E protection.

Figure 8:
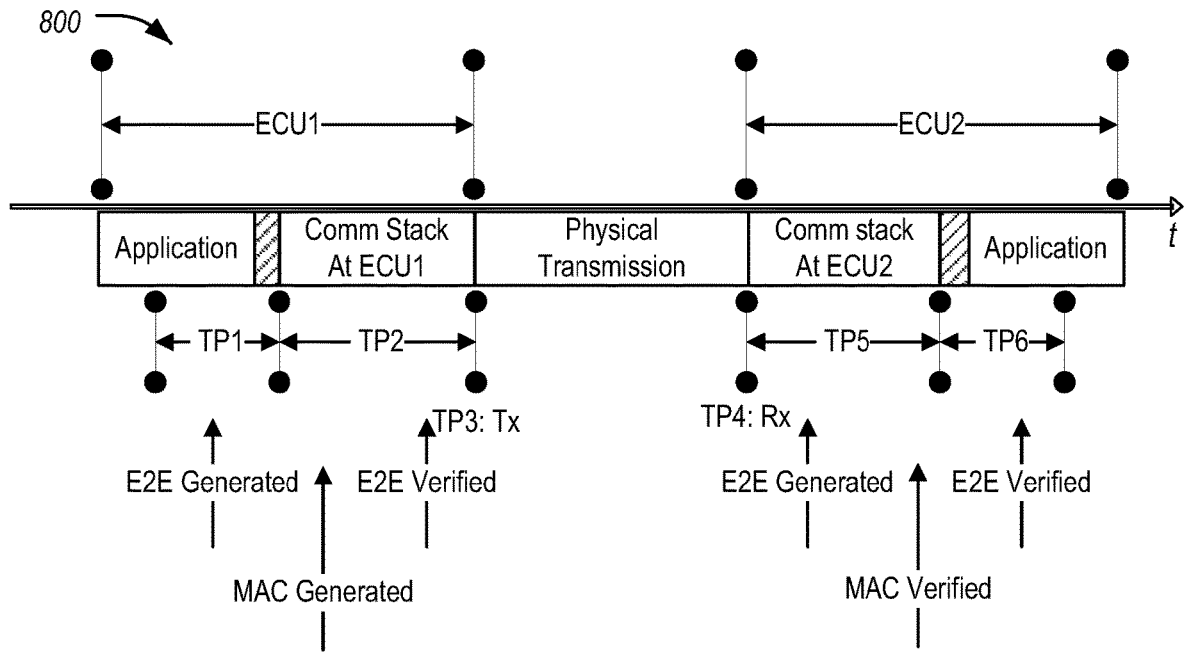
FIG. 8 illustrates an example diagram of a sequential model of functional safety measures and security measures.

FIG. 8 illustrates an example diagram 800 of a sequential model of functional safety measures and security measures. The sequential model also includes a set of additional safety and security measures that may be performed in the context of the communication illustrated above with respect to the diagram 500. However, as structurally shown with respect to the diagram 700, in the sequential model the E2E Protection 308 such as checksum and counter are not packed into the messages 302 that are sent.

In the sequential model, similar to as done in the independent model, the E2E Protection 308 such as a checksum and a counter value are created during TP1. These values are not packed into the messages 302. At TP2, the Security Protection 314 such as a freshness value and a MAC value are created, and similar to the independent model, these values are packed into the messages 302 to be transmitted. However, also during TP2, the checksum and counter are validated before the messages 302 are sent at TP3. In an example, the ECU1 may confirm that the checksums match the data of the received messages 302. In another example, the ECU1 may confirm that for each received message 302 the counter corresponds to the next incremented value.

The messages 302, including the additional freshness and MAC values, but not the checksum and counter values, may be transmitted at TP3 by the communication stack of ECU1 over a vehicle bus 116 and received at TP4 by the communication stack of the ECU2.

During TP5, a combination of smart bus controller 210 and/or smart transceiver 212 located in the communication stack of the ECU2 independently generates the checksum and counter values for the received messages 302. These values are regenerated by the ECU2 because the values were not sent by the ECU1 to the ECU2. In an example, the checksum may be generated using the same approach as used by the ECU1 to generate the checksum. The counter value may be regenerated as an arbitrary increasing value, e.g., based on a variable for the message 302 stream between the ECU1 and the ECU2 maintained at the ECU2. Also during TP5, the ECU2 verifies the freshness and MAC address of the received messages 302, similar to as discussed with regard to the independent model. Additionally, during TP6, the ECU2 verifies the regenerated checksum and counter related to the received messages 302 in manner similar to the independent model.

Thus, in using the sequential model, message 302 authenticity, integrity, and freshness are ensured on the network. Additionally, end-to-end functional safety protection is achieved through E2E Control Fields 308 creation and validation at ECU1, message 302 authentication validation for network transmission, and E2E Control Fields 308 re-creation and validation at ECU2. As an advantage to the independent model, network usage is more efficient than implementations that send the E2E Control Fields 308 in addition to the Security Control Fields 314. However, signal end-to-end timing may potentially be extended due to the double usage of end-to-end checksum and counter creation and validation.

Figure 9:
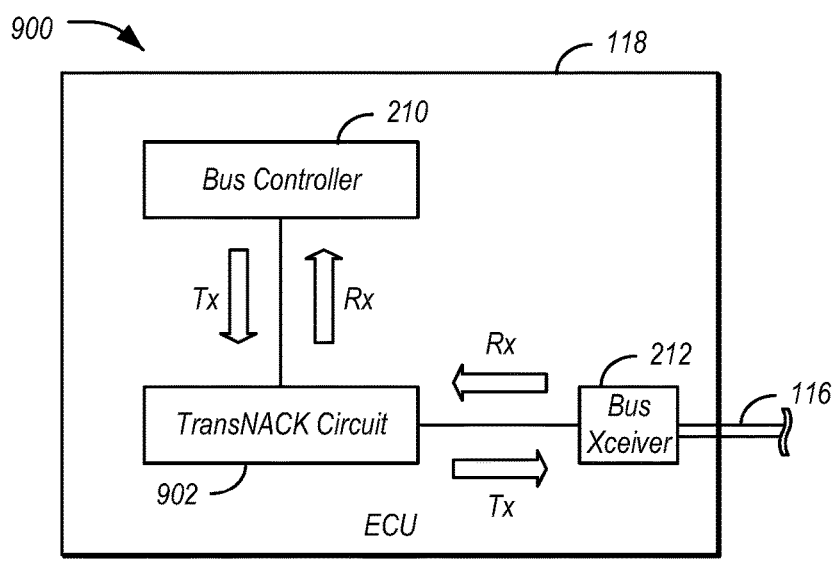
FIG. 9 illustrates an example diagram of an ECU including a TransNACK circuit.

FIG. 9 illustrates an example diagram 900 of an ECU 118 including a TransNACK circuit 902 as an example of the combination of smart bus controller 210 and/or smart transceiver 212 that performs the functions described in detail above with regard to FIG. 8. As shown, the TransNACK circuit 902 may be a separate component included in an ECU 118 between the bus controller 210 and the bus transceiver 212. In other examples, the TransNACK circuit 902 may be included in the bus controller 210 and/or the bus transceiver 212, or otherwise within a component in the safe zone connected to the vehicle bus 116. In operation, the TransNACK circuit 902 may be configured to identify messages 302 that fail to be sent to a destination via the ECU 118.

The TransNACK circuit 902 may be configured to provide information to the ECU 118 to allow for the ECU 118 to better track the counter variable being recreated by the ECU 118. For instance, retry mechanisms of the vehicle bus 116 (such as CAN retries) may cause multiple of the same message to be received for a single send. Thus, TransNACK circuit 902 may be used to count the actual messages 302 that are sent, not retries of the messages 302 that are sent, to better allow the ECU 118 to keep track of the correct counter values to be used in validating and recreating the counter values.

Figure 10:
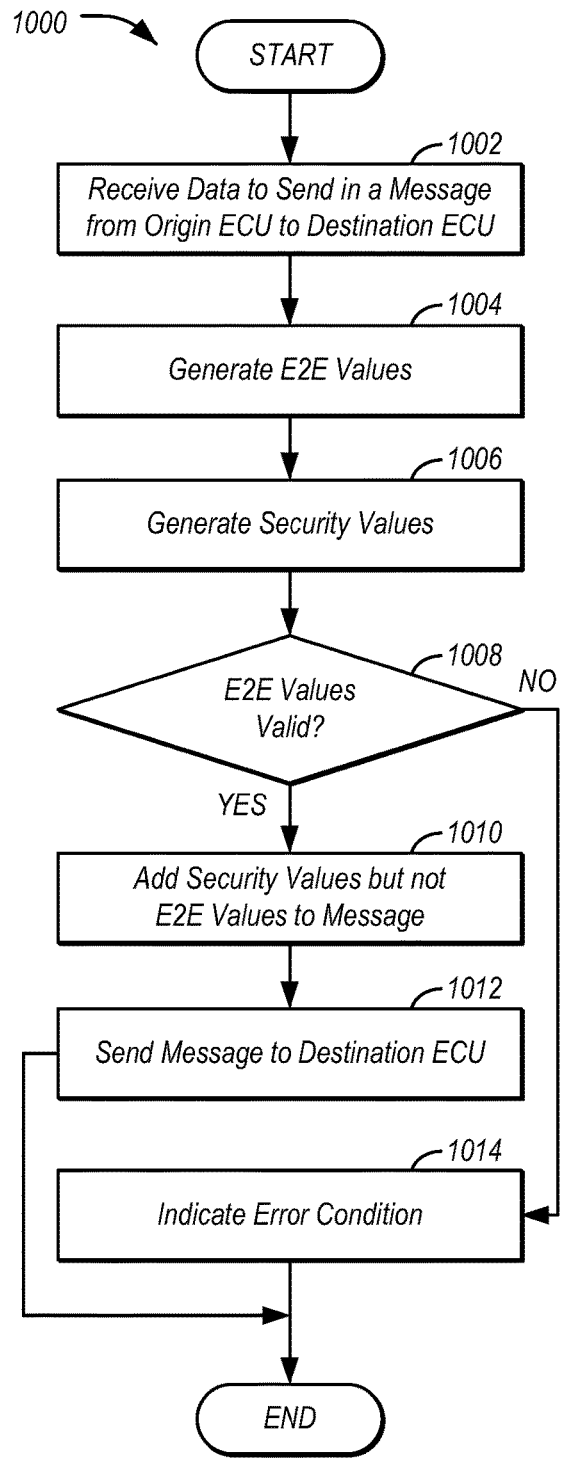
FIG. 10 illustrates an example process for sending a message from an origin ECU to a destination ECU using the sequential model.

FIG. 10 illustrates an example process 1000 for sending a message 302 from an origin ECU 118 to a destination ECU 118 using the sequential model. In an example, the process 1000 may be performed by ECUs 118 of the system 100 as described in detail with respect to the diagrams above.

At operation 1002, the origin ECU 118 receives data to send in a message 302 from the origin ECU 118 to the destination ECU 118. In an example, an application executed by the origin ECU 118 may receive or construct data to send to an application executed by the destination ECU 118. At 1004, the origin ECU 118 generates end-to-end protection 308 values for the message 302. In an example, the end-to-end values may include counter and checksum values. At 506, the origin ECU 118 generates security values for the message 302. In an example, the security values may include freshness and MAC values. These end-to-end and security values may be generated as discussed above with respect to the diagrams above, such as the diagrams 600-700, and 800.

The origin ECU 118 determines whether the end-to-end values are valid at 1008. For instance, the origin ECU 118 validates the counter and checksum values. This validation may be performed by the transceiver safe zone by a component similar to TransNACK before the message is transferred to the vehicle bus 116. If the values are valid, control passes to operation 1010. If not, control passes to operation 1014 to indicate an error condition, such as that sending of the message 302 failed and ECU 118 may take additional measures as specified in the safety strategy such as re-attempt to send the message again. At 1010, the origin ECU 118 adds the security protection 314 values to the message 302. For instance, the security values being added may include the freshness and MAC values. However, the end-to-end values are not added to the message 302. At operation 1012, the origin ECU 118 sends the message 302 to the destination ECU 118. In an example, the message 302 is sent via the vehicle bus 116, addressed to the destination ECU 118.

Figure 11:
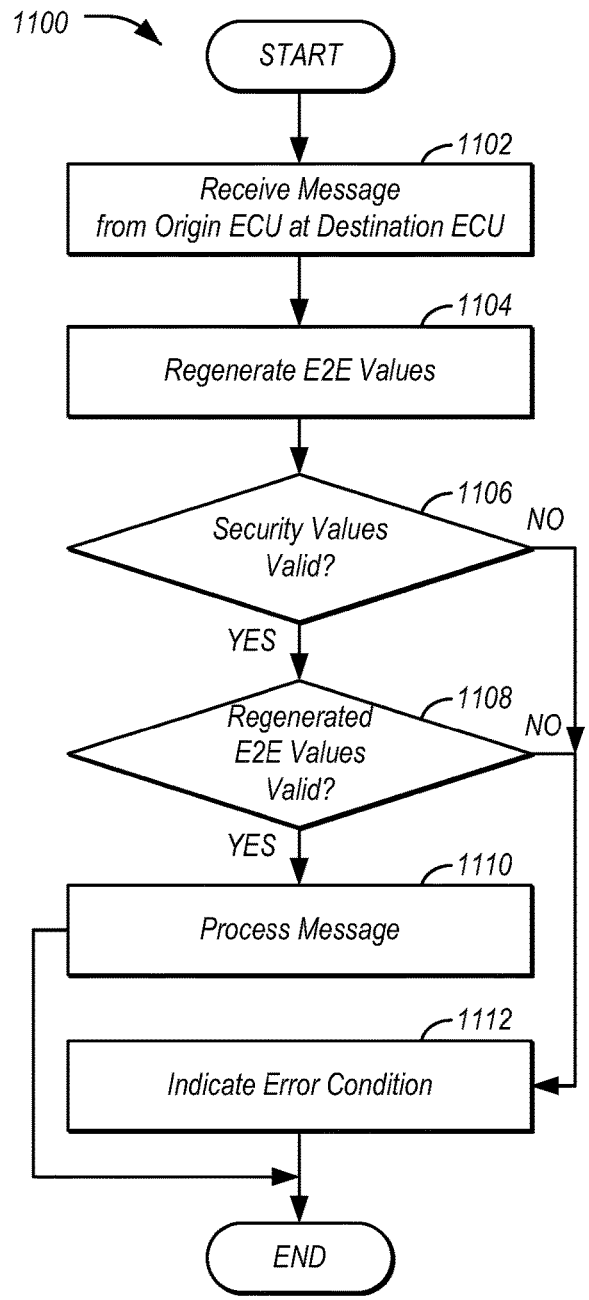
FIG. 11 illustrates an example process for receiving a message from an origin ECU by a destination ECU using the sequential model.

FIG. 11 illustrates an example process 1100 for receiving a message 302 from an origin ECU 118 by a destination ECU 118 using the sequential model. In an example, as with the process 1000, the process 1100 may be performed by ECUs 118 of the system 100 as described in detail above.

At operation 1002, the destination ECU 118 receives a message 302 from the origin ECU 118. In an example, the destination ECU 118 may receive a message 302 sent at operation 1012 of the process 1000.

At 1004, the destination ECU 118 regenerates the end-to-end protection 308 values in the safe transceiver zone by a component such as TransNACK. These values may include the counter and checksum values, and may be regenerated by the destination ECU 118 because the counter and checksum values were not sent by the origin ECU 118 to the destination ECU 118. In an example, the checksum may be generated using the same approach as used by the origin ECU 118 to generate the checksum. The counter value may be regenerated as an arbitrary increasing value, e.g., based on a variable for the message 302 stream maintained at the destination ECU 118. This value may be identified via the TransNACK circuit 902 to account for duplicate messages 302 or other message 302 transmission issues.

The destination ECU 118 determines whether the security protection 314 values are valid at 1106. In an example, the destination ECU 118 may verify that the freshness indicates the message 302 was sent at a time that is less than a predefined threshold time ago. In another example, the destination ECU 118 may verify that the MAC address is of the expected sender origin ECU 118. If the security values are determined to be valid, control passes to operation 1108. If not, control passes to operation 1112 to indicate an error condition with respect to reception of the message 302.

At 1108, the destination ECU 118 determines whether the regenerated end-to-end protection 308 values are valid. This validation may be performed by the high integrity application area (Safe Zone) 202. In an example, the destination ECU 118 may confirm that the checksums match the data of the received messages 302 and was not compromised inside the unsafe zone (e.g., 204, 206 and 206) while the information was en-route from the transceiver safe zone (e.g., 210, 212) to the application safe zone (e.g., 202). In another example, the destination ECU 118 may confirm that for each received message 302 the counter corresponds to the next incremented value. If the counter and checksum values are determined to be valid, control passes to operation 1110 to process the message 302. If not, control passes to operation 1112.

Computing devices described herein, such as the VCS 104, mobile device 110, ECUs 118, and remote data server 126, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a first electronic control unit (ECU) in communication with a second ECU over a vehicle bus,
wherein the first ECU is configured to
generate functional safety values and security protection values for a message, the functional safety values including counter and checksum values, the security protection values including freshness and message authentication code (MAC) values,
validate the security protection values for the message using a counter maintained by a TransNACK circuit, the TransNACK circuit updating the counter by counting messages sent by the first ECU excluding message retries, and
send the message to the second ECU including the security protection values but not the functional safety values, such that the second ECU regenerates the functional safety values.

2. The system of claim 1, wherein the second ECU is further configured to:
regenerate the security protection values responsive to receipt of the message, and
validate the regenerated security protection values for the message.

3. The system of claim 1, wherein the security protection values include a freshness value, the first ECU is further configured to generate the freshness value, and the second ECU is further configured to use the freshness value to validate that the message was sent at a time that is less than a predefined threshold time ago.

4. The system of claim 1, wherein the functional safety values include a counter value, and the first ECU is further configured to generate the counter value as an arbitrary increasing value based on a variable for a stream of messages from the first ECU to the second ECU.

5. The system of claim 4, wherein the second ECU includes a second TransNACK circuit configured to count the actual sent or received messages for a message flow to allow for recreation of the counter value.

6. The system of claim 1, wherein the first ECU is further configured to execute a first application programmed to generate the message, and the second ECU is further configured to execute a second application programmed to receive the message.

7. The system of claim 1, wherein the second ECU is further configured to:
generate functional safety values and security protection values for a second message responding to the message,
validate the functional safety values for the second message, and
send the second message to the first ECU including the security protection values for the second message but not the functional safety values for the second message.

8. A method comprising:
generating, by a first electronic control unit (ECU), functional safety values for a first message;
validating, by the first ECU using a counter maintained by a TransNACK circuit, the functional safety values, the TransNACK circuit updating the counter by counting messages sent by the first ECU excluding message retries, the functional safety values including counter and checksum values;
removing the functional safety values from the first message;
sending, to a second ECU, the first message including security protection values but not the functional safety values, the security protection values including freshness and message authentication code (MAC) values;
regenerating the functional safety values by the second ECU; and
validate the regenerated functional safety values by the second ECU.

9. The method of claim 8, wherein the first ECU is connected to the second ECU over a vehicle bus.

10. The method of claim 8, further comprising:
generating the freshness value by the first ECU; and
using the freshness value by the second ECU to validate that the first message was sent at a time that is less than a predefined threshold time ago.

11. The method of claim 8, further comprising:
executing, by the first ECU, a first application programmed to generate the first message; and
executing, by the second ECU, a second application programmed to receive the first message.

12. The method of claim 8, further comprising:
generating, by the second ECU, functional safety values for a second message;
validating, by the second ECU, the functional safety values of the second message;
sending, to the first ECU, the second message including security protection values for the first message but not the functional safety values for the second message;
regenerating the functional safety values for the second message by the first ECU; and
validate the functional safety values for the second message by the first ECU.

13. A non-transitory computer-readable medium comprising instructions that, when executed by a processor of a first electronic control unit (ECU) in communication with a second ECU over a vehicle bus, cause the first ECU to:
generate functional safety protection control fields including counter and checksum, and security protection control fields including freshness and message authentication code (MAC) values for a message,
validate the functional safety protection control fields for the message using a counter maintained by a TransNACK circuit, the TransNACK circuit updating the counter by counting messages sent by the first ECU excluding message retries,
remove the functional safety protection control fields from the message, and
send the message to the second ECU including the security protection control fields but not the functional safety protection control fields, such that the second ECU regenerates the functional safety protection control fields.

14. The medium of claim 13, further comprising instructions to cause the first ECU to generate a freshness value, wherein the second ECU uses the freshness value to validate that the message was sent at a time that is less than a predefined threshold time ago.

15. The medium of claim 13, further comprising instructions to cause the first ECU to generate a counter value as an arbitrary increasing value based on a variable for a stream of messages from the first ECU to the second ECU.

16. The medium of claim 13, wherein the MAC value indicates a MAC of the first ECU.

17. The medium of claim 13, further comprising instructions to cause the first ECU to execute a first application programmed to generate the message, wherein the second ECU executes a second application programmed to receive the message.

\* \* \* \* \*